Figure 1:
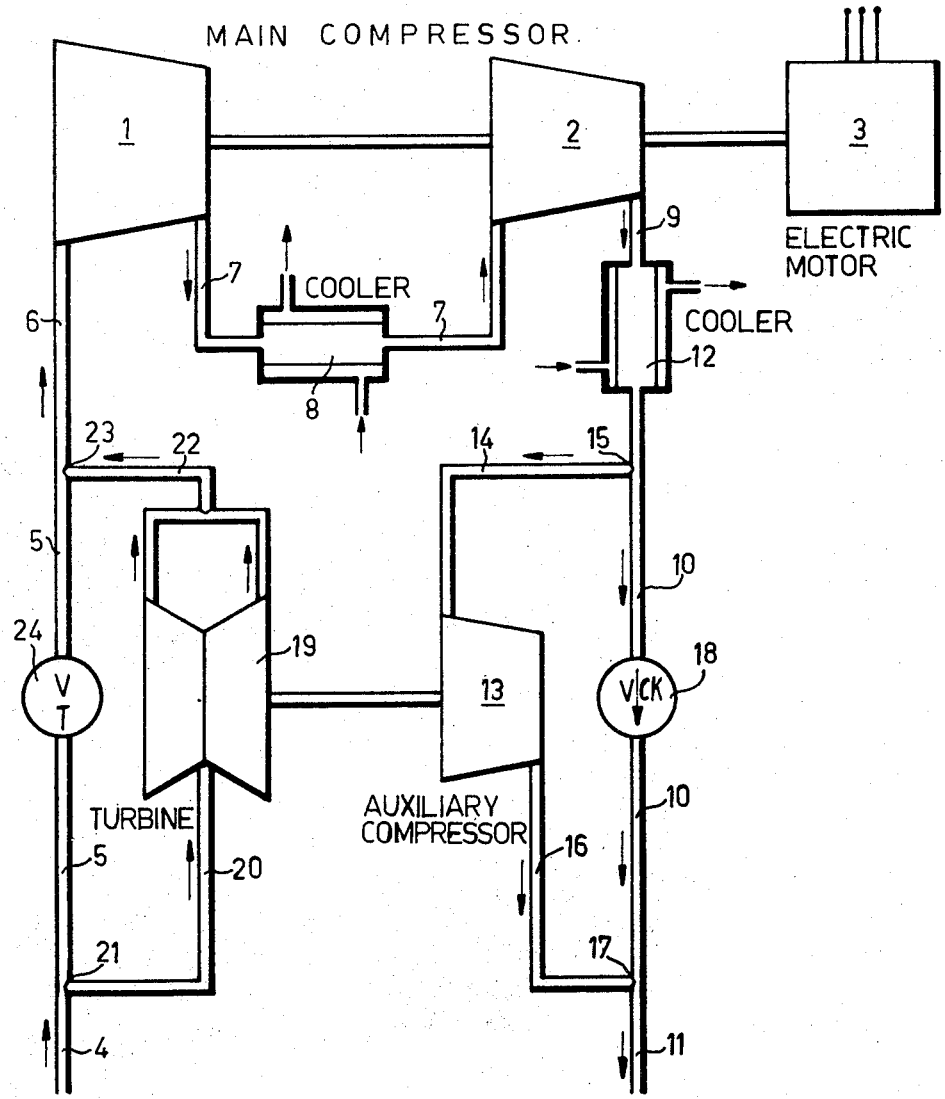

Nov. 24, 1959    H. MEIENBERG    2,914,242
TURBO-COMPRESSOR PLANT

Filed Jan. 10, 1958    2 Sheets-Sheet 2

United States Patent Office 2,914,242
Patented Nov. 24, 1959

2,914,242

TURBO-COMPRESSOR PLANT

Hans Meienberg, Zurich, Switzerland, assignor to Escher Wyss Aktiengesellschaft, Zurich, Switzerland, a corporation of Switzerland Application January 10, 1958, Serial No. 708,227

Claims priority, application Switzerland February 1, 1957

13 Claims. (Cl. 230—115)

This invention relates to an arrangement for improving the operation of turbo-compressor plants at partial loads.

It is known that the economical control of turbo-compressors with variable intake and constant delivery pressure as well as with any chosen intake quantity and pressure can be effected by adjusting the rotary speed. This can be done fairly simply if the compressor is driven by a steam turbine. Electric-motor arrangements are also known for adjusting the speed, but these either involve energy losses which at least equal any saving of energy attributable to improved compressor performance resulting from the speed adjustment, or they are complicated and involve very high initial capital outlays.

As a consequence, when an electric driving motor is used for the turbo-compressor, it is still the usual practice to operate at constant speed and to control the throughput quantity by means of a throttle valve in the intake conduit. Other arrangements are known, for example a turbine ahead of the compressor and coupled thereto to permit the energy which would be destroyed by throttling to be converted to useful mechanical work. This attains some economy in energy input to the compressor but does not extend the stable operating range of the compressor beyond the range obtained by intake throttling.

As is well known, every turbo-compressor operates in an unstable range if the intake volume falls below a certain value. If, at such time, the inlet pressure of the compressor is decreased by a throttle member in the suction or intake conduit, then the throughput volume at the inlet increases in the same proportion as the absolute pressure decreases. When the intake volume is at the lower limit of the stable operating range of the compressor, the intake volume in advance of the throttle member has a smaller value with respect to the intake volume beyond the throttle member, in inverse proportion to the absolute pressures ahead of and beyond said throttle member. The quantity by weight remains unchanged but the volumes are inversely proportional to the absolute pressures. Intake throttling thus permits the compressor to be driven with a smaller intake quantity of medium by weight than would be possible if the throughput of medium were fed directly to the compressor in that state in which it approaches the throttle valve. The possible degree of throttling depends on the extent to which the actual compression ratio of the compressor at the limit of the stability range exceeds the required amount of the compression ratio.

If the throttle member is replaced by a turbine, then the compression ratio set up at the stability limit is not altered substantially. Consequently the inlet pressure at the compressor cannot be lowered beyond that characteristic of intake throttling.

According to the invention, in a turbo-compressor plant for compressing a gaseous medium, a main compressor delivers the said medium into a pressure conduit, and shunted across a portion of the pressure conduit is an auxiliary compressor driven by a turbine which is mechanically independent of the main compressor, and therefore rotates at a speed independent of that of the main compressor. Furthermore, a flow connection is provided between the flow path of the said gaseous medium and this turbine in such a manner that gaseous driving medium of said turbine is allowed to pass serially through the turbine and at least a part of the main compressor. This driving medium thus expands in the turbine from a pressure intermediate the inlet and outlet pressures of the main compressor to a lower pressure while doing work. Compressed medium delivered from the main compressor is thereby caused to be additionally compressed by the auxiliary compressor when the turbine is operated. At a given delivery pressure, therefore, at least the last stage of the main compressor reaches a lower pressure region. The arrangement according to the invention thus allows reduction of the throughput quantity correspondingly without the main compressor reaching the unstable operating range.

Figure 2:
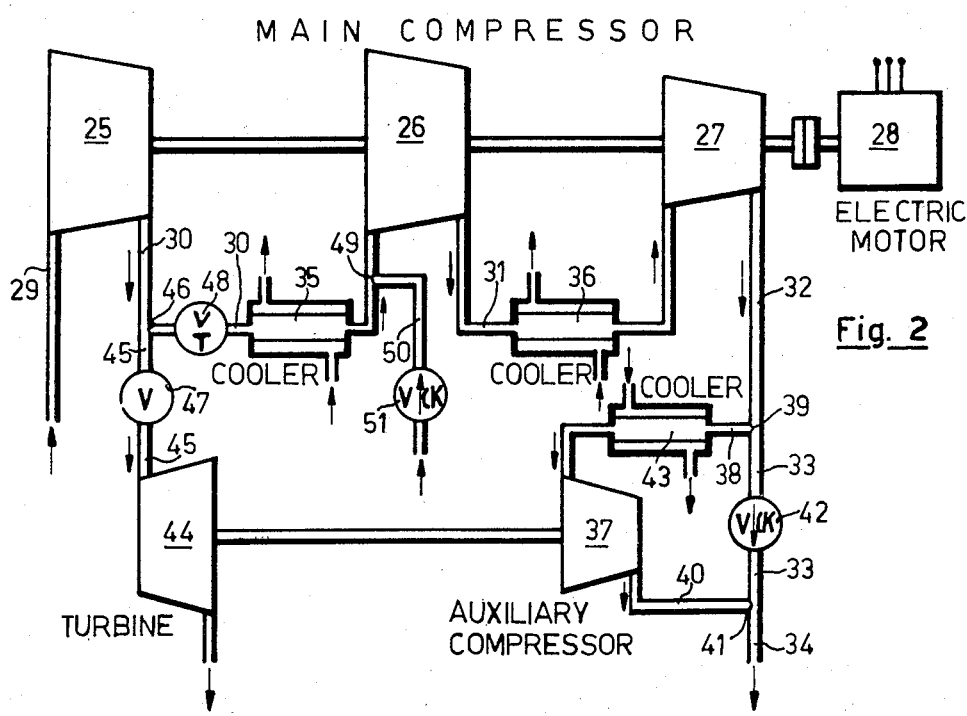
Figure 3:
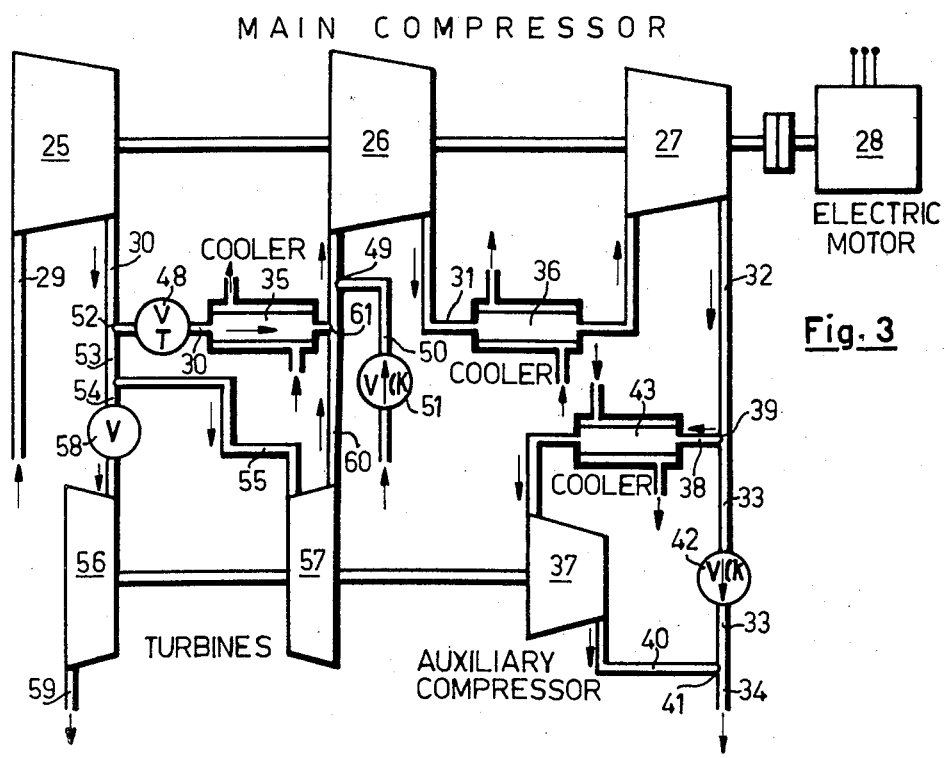

Figures 1, 2 and 3 each show one example of the subject of the invention diagrammatically, the individual embodiments as shown principally differing in the arrangement of the turbine driving the auxiliary compressor in relation to the flow path of the medium.

According to Figure 1, a main compressor having two housings and the stages 1 and 2 is driven by an electric motor 3. Gaseous medium to be compressed is fed to stage 1 through an intake conduit consisting of the portions 4, 5 and 6. A connecting conduit 7 having a built-in intermediate cooler 8 feeds the medium leaving stage 1 to the inlet of stage 2. After leaving the second stage, the working medium reaches a pressure conduit consisting of the portions 9, 10 and 11. An aftercooler 12 is built-in between the portions 9 and 10.

Shunted across the portion 10 of the pressure conduit is an auxiliary compressor 13, the inlet of which is connected via a conduit 14 to a point 15, and the outlet via a conduit 16 to a point 17 of the pressure conduit. A closure member, shown as a check valve 18, is built into the portion 10 of the pressure conduit across which the auxiliary compressor 13 is shunted.

The auxiliary compressor 13 is driven by a turbine 19 which is mechanically independent of the main compressor and thus rotates at a speed independent of that of the main compressor 1, 2. The inlet of the turbine 19 communicates via a supply conduit 20 with a point 21 of the intake conduit 4, 5, 6 forming part of the flow path of the medium to be compressed. The outlet communicates with a point 23 via a discharge conduit 22. The turbine 19 is thus shunted across the portion 5 of the intake of the main compressor 1, 2. A closure element 24 is provided in this portion of the intake conduit.

The plant operates as follows:

When operating with large throughput quantities the closure element 24 is fully open. There is then practically no pressure drop of medium traversing portion 5 of the intake conduit so that the turbine 19, shunted between the points 21 and 23, receives no pressure head. It therefore remains stationary, as does the auxiliary compressor 13. The medium delivered by the main compressor 1, 2 therefore flows through the cooler 12, the portion 10 of the pressure conduit and the check valve 18 interposed therein.

At partial loads with small throughput quantities, however, the closure element 24 is closed. By virtue of the suction effect set up by the main compressor 1, 2, its inlet pressure and thus the pressure at the point 23 are reduced to below the pressure at the point 21 in the intake conduit. The pressure at 21 therefore lies between the inlet and outlet pressures of the main compressor 1, 2 and the connections 20, 22 permit the medium to expand in the turbine 19 before reaching stage 1 of the compressor from the pressure at the point 21 in the intake conduit to the lower pressure at the point 23, while doing work. The driving medium of turbine 19 thereby passes serially through this turbine and then through the main compressor 1, 2.

The turbine 19 drives the auxiliary compressor 13 which now sets up a pressure head between the points 17 and 15. The check valve 18 prevents return flow of the medium through the portion 10 of the conduit. The medium leaving stage 2 of the main compressor thus flows after being cooled in the cooler 12 from the point 15 in the pressure conduit through the conduit 14, is further compressed in the auxiliary compressor 13 and finally returned to the pressure conduit at the point 17 through the conduit 16.

By means of the auxiliary compressor 13, the compression ratio produced by the plant is higher than that produced by the main compressor 1, 2 alone. The turbine 19 can therefore be so constructed that at a given delivery pressure in the pressure conduit, the pressure in the supply conduit 6 at the inlet side of the compressor 1, 2 is smaller than it would be if the auxiliary compressor 13 were omitted. The compressor plant is therefore capable of stable operation with a smaller volume of working medium referred back to the state in portion 4 of the intake conduit.

Since, in comparison with the compressor 13, the turbine 19 has to handle a larger throughput volume, it is shown as a double-flow turbine in the example of Figure 1. However, if necessary, it is possible to drive the auxiliary compressor 13 by more than two turbine parts which are traversed by the working medium in parallel. In order to obtain a favorable turbine and auxiliary-compressor construction, a transmission gearing could be interposed between them, in which case the auxiliary compressor would rotate faster than the turbine driving it.

The closure element 24 in the portion 5 of the intake is preferably in the form of a throttle valve which can be so adjusted that only a portion of the entire throughput quantity of the main compressor flows through the portion 5 of the intake conduit whilst the remainder flows through the turbine 19. By appropriate adjustment of the throttle valve, the ratio of the quantity of medium flowing through the turbine 19, to the total quantity of medium flowing through portion 6, can be kept within predetermined limits. If the throttle valve can be adjusted between fully open and fully closed positions, then this ratio can be varied between zero and one.

In Fig. 1, supply connection 20 of turbine 19 is shown to be connected at 21 to the intake conduit 4, 5 of the main compressor. However, it is obvious that, without departing from the spirit of the invention, supply connection 20 can also be open to the atmosphere if intake conduit 5 communicates with the atmosphere.

According to Figure 2, the main compressor has three stages 25, 26, 27 in series with one another and driven by an electric motor 28. When operating with large throughput quantities, atmospheric air enters stage 25 through an intake conduit 29 and leaves this stage through a connecting conduit 30 leading to the next stage 26. The outlet from the stage 26 is connected to the inlet of the stage 27 though a connecting conduit 31. After leaving the stage 27, the medium reaches a pressure conduit comprising the portions 32, 33 and 34. Intermediate coolers 35, 36 are provided in the connecting conduits 30, 31, respectively.

An auxiliary compressor 37 is shunted across the portion 33 of the pressure conduit. The inlet side of the auxiliary compressor 37 communicates with a point 39 of the pressure conduit via a conduit 38 and the outlet side with a point 41 via a conduit 40. In the portion 33 of the pressure conduit across which the auxiliary compressor 37 is shunted, there is a check valve 42. An intermediate cooler 43 is provided in the supply conduit 38 for the auxiliary compressor 37.

The auxiliary compressor 37 is driven by a turbine 44 rotating at a speed independent of that of the main compressor 25, 26, 27. This turbine 44 is connected to the flow path of the medium to be compressed by a flow connection 45. In this case, the connection 45 leads from the connecting conduit 30 at a point 46 between the stages 25 and 26 of the main compressor. The conduit 45 serves as a line for tapping compressed medium from the connecting conduit 30 between the stages 25 and 26 of the main compressor and for supplying it as driving medium to the turbine 44.

The conduit 45 is provided with a closure member 47, and in the connecting conduit 30 there is a throttle valve 48 between the tapping point 46 and the inlet to the subsequent compressor stage 26.

When operating with large throughput quantities, the closure member 47 is fully closed. The medium sucked from atmosphere by the compressor 25 then flows in series through the stages 25, 26 and 27 of the main compressor and thereafter reaches the portion 34 of the pressure conduit through the portions 32, 33 and the check valve 42. The turbine 44 receives no driving medium so there is no supply through the auxiliary compressor 37.

If, however, the plant is driven with a small throughput quantity, the closure member 47 is open and the throttle valve 48 is open only to an extent such that a pressure head is set up between the tapping point 46 and the inlet to the subsequent compressor stage 26. A portion of the medium which has been compressed in stage 25 then flows through the conduit 45 and expands through the turbine 44 from a pressure between the inlet and outlet pressures of the main compressor unit 25, 26, 27 (i.e., from the pressure at the point 46 in the connecting conduit 30) to the suction pressure of the main compressor 25, 26, 27, i.e. in this case to atmosphere, while doing work. The turbine 44 drives the auxiliary compressor 37 which, as described with reference to Figure 1, further compresses the medium leaving the last stage of the main compressor and by by-passing the check valve 42 delivers into the part 34 of the pressure conduit.

At a predetermined delivery pressure, the effect of the additional compressor 37 is to lower the outlet pressure of the last stage 27. The two stages 26 and 27 thus work in a lower pressure region and can therefore still operate in a stable range with a lower throughput quantity by weight.

By appropriate adjustment of the throttle valve 48, it is possible to decrease the inlet pressure of the stage 26 of the main compressor down to the intake pressure of the stage 25, which in this case is atmospheric pressure. In the plant according to Figure 2, there is a by-pass line 50 having a check valve 51 and connecting the point 49 of the connecting conduit 30 to atmosphere. Because of this, the throttle valve 48 can be fully closed at partial loads so that the entire throughput quantity at the stage 25 of the main compressor is forced to expand through the turbine 44. The next compressor stage 26 then draws directly from atmosphere. The auxiliary compressor 37 must, in such case, be so dimensioned that it compensates for the omitted compression in the stage 25. Since the discharge of turbine 44 and the by-pass intake 50 communicate with the atmosphere as does intake conduit 29, they can all be described as connected together.

In the arrangement according to Figure 2, the stable operating range for small throughput quantities is better than that afforded by the arrangement of Figure 1. It should be noted that the first stage 25 of the main compressor conveys a greater weight of medium than the following stages 26 and 27 of the main compressor.

More energy is therefore available to the turbine 44 than there would be if the weight of medium expanded in it were the same as that compressed in the auxiliary compressor 37. The auxiliary compressor 37 can therefore compress to a higher degree.

It is even possible for the main compressor to operate as normally it does with a full quantity of working medium, even when only half the full load quantity reaches the pressure conduit 34. As an example, assume that for full load operation the compressor stages 25, 26 and 27 are each designed for a compression ratio of 1:2 so that the overall compression ratio is 1:8. If, with half the full load throughput quantity, the same overall compression ratio is required, then the throttle valve 48 is closed completely, and the compressor stage 26 then draws from atmosphere through the conduit 50. It thus has half the inlet pressure and, at the same operating conditions, i.e. at the same volume of inlet medium, amounts to half the quantity by weight. The stages 26 and 27 retain their compression ratios of 1:2, so that together they compress by a ratio 1:4. If the auxiliary compressor 37 is designed to compress the medium further by 1:2, then the stages 26 and 27 of the main compressor, together with the auxiliary compressor 37, result in a compression ratio of 1:8. However, since the stage 25 takes in medium at the same initial pressure, it still compresses the same quantity as at full load to a ratio 1:2. When the closure member 47 is open, this quantity expands through the turbine 44 at the same pressure ratio as that to be obtained by the auxiliary compressor 37. However, since twice the quantity by weight is available to the turbine 44, it is still able to drive the auxiliary compressor 37 if the entire set 44, 37 operates with only a 50% efficiency.

By appropriately setting the closing members 47 and 48, not only the above described terminal operating conditions of the compressor can be established but also any desired intermediate conditions. It is also possible to provide a further throttle member in the intake conduit 29 for controlling the throughput of the stage 25. The closure or throttle member 47 can also be located at any other point of the flow path of the driving medium of the turbine 44, for example in the discharge conduit instead of in the supply conduit 45.

In the plant shown in Figure 3, the same parts 25 to 43 are provided as in Figure 2, as well as the throttle valve 48 and the by-pass intake 50 with check valve 51. The same reference numerals are used in both figures for these parts. In Figure 3, at a point 52 in the connecting conduit 30 ahead of the throttle valve 48, there is a withdrawal conduit 53 which is divided into two branches 54 and 55. Two turbines 56 and 57 are provided for driving the auxiliary compressor 37. The branch 54 of the withdrawal conduit, in which a closure member 58 is provided, leads to the inlet of the turbine 56. This turbine has a discharge conduit 59 which communicates via the atmosphere with the intake conduit 29 of the main compressor. The outlet of the turbine 57 is connected by a conduit 60 to a point 61 in the connecting conduit 30, located between the throttle member 48 and the inlet of the subsequent stage 26 of the main compressor. The two turbines 56 and 57 are traversed in parallel by the medium flowing through the withdrawal conduit 53. The turbine 57 receives medium as soon as the originally fully open throttle valve 48 is brought into a throttling position, and the turbine 56 receives medium as soon as the closure member 58 is opened. This arrangement gives more flexibility for adapting the compressor plant to various operating conditions. With regard to compression beyond the outlet of the stage 25, it will be noted that a plant such as that shown in Figure 3, and including stages 26 and 27 and the auxiliary compressor 37 when the latter is driven by the turbine 57, corresponds closely to the showing in Figure 1.

For ready reference during consideration of the specification and claims, the following definitions are given:

*Flow path.*—When used without qualification means flow path through the main compressor as follows:
Figure 1: 4, 5, 6, 1 (7—8—7) 2, 9, 10, 11
Figure 2: 29, 25, 30, 46, 35, 49, 26, 31, 36, 27, 32, 33, 34
Figure 3: 29, 25, 30, 52, 35, 49, 26, 31, 36, 27, 32, 33, 34

The flow paths of Figures 2 and 3 are basically the same, but Figure 3 has two turbines and so splits the flow between the two.

It is important to keep in mind the fact that the suction intake of the main compressor is the source of the pressure drop through turbine 19 of Figure 1 and turbine 57 of Figure 3. The exhaust from turbine 19 of Figure 1 passes through compressor units 1 and 2. The exhaust from the turbine 44 of Figure 2 and from turbine 56 of Figure 3 flows to atmosphere which is the source of the gas to the main intake 29 of each of these two figures.

What is claimed is:

1. In a turbo-compressor plant for compressing a gaseous medium, the combination of a main compressor and flow connections including a pressure conduit, connected with said main compressor so as to define a flow path for the said medium which leads serially through said main compressor and then through said pressure conduit; an auxiliary compressor shunted across a portion of said pressure conduit; a closure member arranged in said portion of the pressure conduit; motor means connected to drive said main compressor; turbine means, mechanically independent of said main compressor, and connected to drive said auxiliary compressor; and connections for the supply and discharge of driving medium to and from said turbine means, at least one of said last named connections communicating with a point of said flow path for the gaseous medium so as to allow the driving medium of said turbine means to pass serially through at least a part of said turbine means and at least a part of said main compressor.

2. The combination defined in claim 1 in which the closure member arranged in said portion of the pressure conduit across which the auxiliary compressor is shunted, is a check valve.

3. The combination defined in claim 1 in which the turbine means which drives the auxiliary compressor affords more than one flow path and these flow paths are arranged in parallel.

4. In a turbo-compressor plant for compressing a gaseous medium, the combination of a main compressor having an inlet and an outlet; an intake conduit for the medium to be compressed, having one end connected with the inlet of said main compressor; a pressure conduit having one end connected with the outlet of said main compressor, through which the compressed gaseous medium is discharged; an auxiliary compressor shunted across a portion of said pressure conduit; a closure member arranged in said portion of the pressure conduit across which the auxiliary compressor is shunted; motor means connected to drive said main compressor; turbine means, mechanically independent of said main compressor, and connected to drive said auxiliary compressor; flow connections for the supply and discharge of driving medium to and from said turbine means, by which the said turbine means may be connected in series with portions of the main compressor; and flow controlling means, which when closed limit flow through said turbine means to said series relation.

5. The combination defined in claim 4 in which said flow controlling means is an adjustable thottling valve.

6. In a turbo-compressor plant for compressing a gaseous medium the combination of a main compressor comprising at least two serially arranged stages; flow connections including an intake conduit, connecting conduit means communicating with a source supplying the gaseous medium to be compressed between stages and a pressure conduit, arranged to cause said medium to flow serially through said intake conduit, then through said stages and then through said pressure conduit; an auxiliary compressor shunted across a portion of said pressure conduit; a closure member arranged in said portion of the pressure conduit across which the auxiliary compressor is shunted; motor means connected to drive said main compressor; turbine means, mechanically independent of said main compressor, connected to drive said auxiliary compressor; connections for the supply and discharge of driving medium to and from said turbine means, defining a flow path for said driving medium; the supply connection issuing from a point of said connecting conduit between said stages of the main compressor, the said driving medium being thereby tapped from said connecting conduit and allowed to expand through said turbine means while doing work; and a throttle valve arranged in the said connecting conduit between the point from which the driving medium is tapped and the subsequent stage of the main compressor.

7. The combination defined in claim 6 in which a throttle valve is arranged in the flow path of the driving medium of the turbine means.

8. The combination defined in claim 6 in which the discharge connection of the turbine means communicates with the source of medium to be compressed.

9. The combination defined in claim 8 comprising a by-pass line communicating with the source of medium to be compressed and connected to a point of the connecting conduit situated between the throttle valve and the subsequent stage of the main compressor, through which by-pass line medium to be compressed can directly enter the said subsequent stage without passing through the preceding stage.

10. The combination defined in claim 9 in which the said by-pass line comprises a check valve.

11. The combination defined in claim 6 in which the discharge connection of the turbine means is connected to a point of the connecting conduit situated between the throttle valve and the subsequent stage so that the turbine is shunted across a portion of the said connecting conduit which comprises the throttle valve.

12. In a turbo-compressor plant for compressing a gaseous medium the combination of a main compressor comprising at least two serially arranged stages; flow connections including an intake conduit communicating with a source of supply of gaseous medium to be compressed, a connecting conduit between said stages and a pressure conduit, serving to cause the said medium to flow serially through said intake conduit, then through said stages and then through said pressure conduit; an auxiliary compressor shunted across a portion of said pressure conduit; a closure member arranged in said portion of the pressure conduit across which the auxiliary compressor is shunted; motor means connected to drive said main compressor; two turbines mechanically independent of said main compressor, connected to drive said auxiliary compressor; flow connections communicating with a point of said connecting conduit between said stages of the main compressor, serving to direct driving medium tapped from said connecting conduit in parallel to said two turbines; a throttle valve arranged in said connecting conduit between said point from which driving medium is tapped and the subsequent stage of the main compressor, one of said turbines having a discharge connection which communicates with the intake conduit of the main compressor and the other a discharge connection which communicates with the connecting conduit at a point situated between the throttle valve and the subsequent stage; and valve means for arresting flow of driving medium through said one turbine.

13. The combination defined in claim 12 comprising a by-pass valve which, when opened, allows medium to be compressed to enter said subsequent stage without passing through the preceding stage.

References Cited in the file of this patent

UNITED STATES PATENTS

| 1,140,065 | Rateau | May 18, 1915 |
| 1,390,829 | Smott | Sept. 3, 1921 |

FOREIGN PATENTS

| 114,967 | Switzerland | May 17, 1926 |
| 480,936 | France | July 18, 1916 |
| 630,839 | Great Britain | Oct. 21, 1949 |
| 681,480 | Germany | Sept. 23, 1939 |
| 940,683 | Germany | Mar. 22, 1956 |